Figure 1:
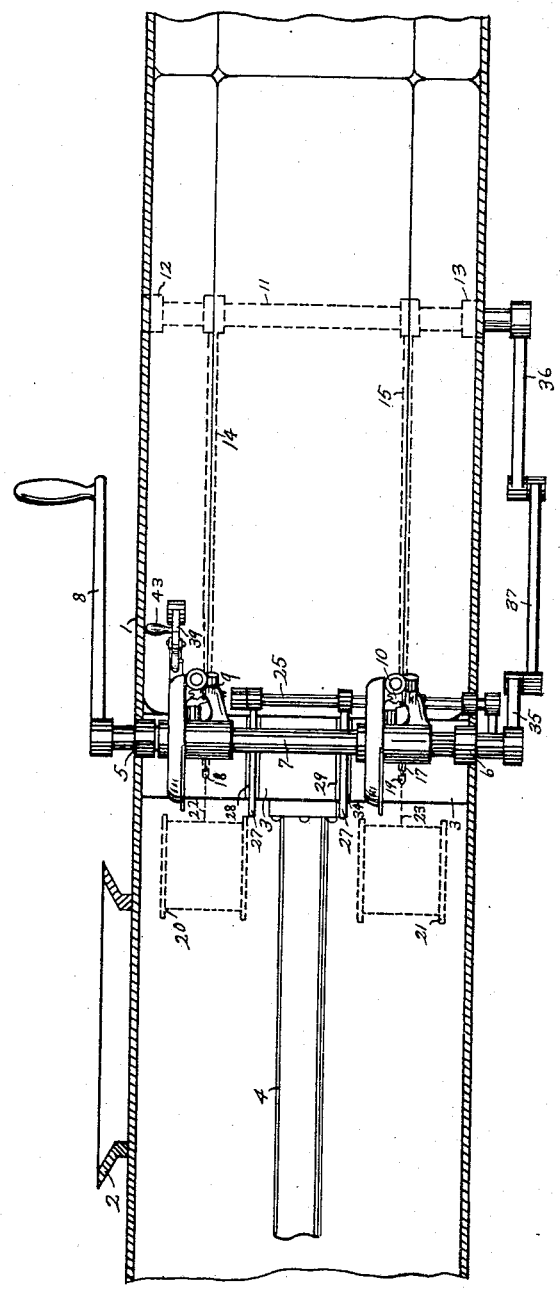

A. T. DUDLEY.
BALING PRESS.
APPLICATION FILED APR. 10, 1913.

1,205,981.

Patented Nov. 28, 1916.
2 SHEETS—SHEET 1.

WITNESSES:
J. M. Snyder
E. Stahl

INVENTOR
Andrew T. Dudley.
BY
Hardway & Cathey
ATTORNEYS.

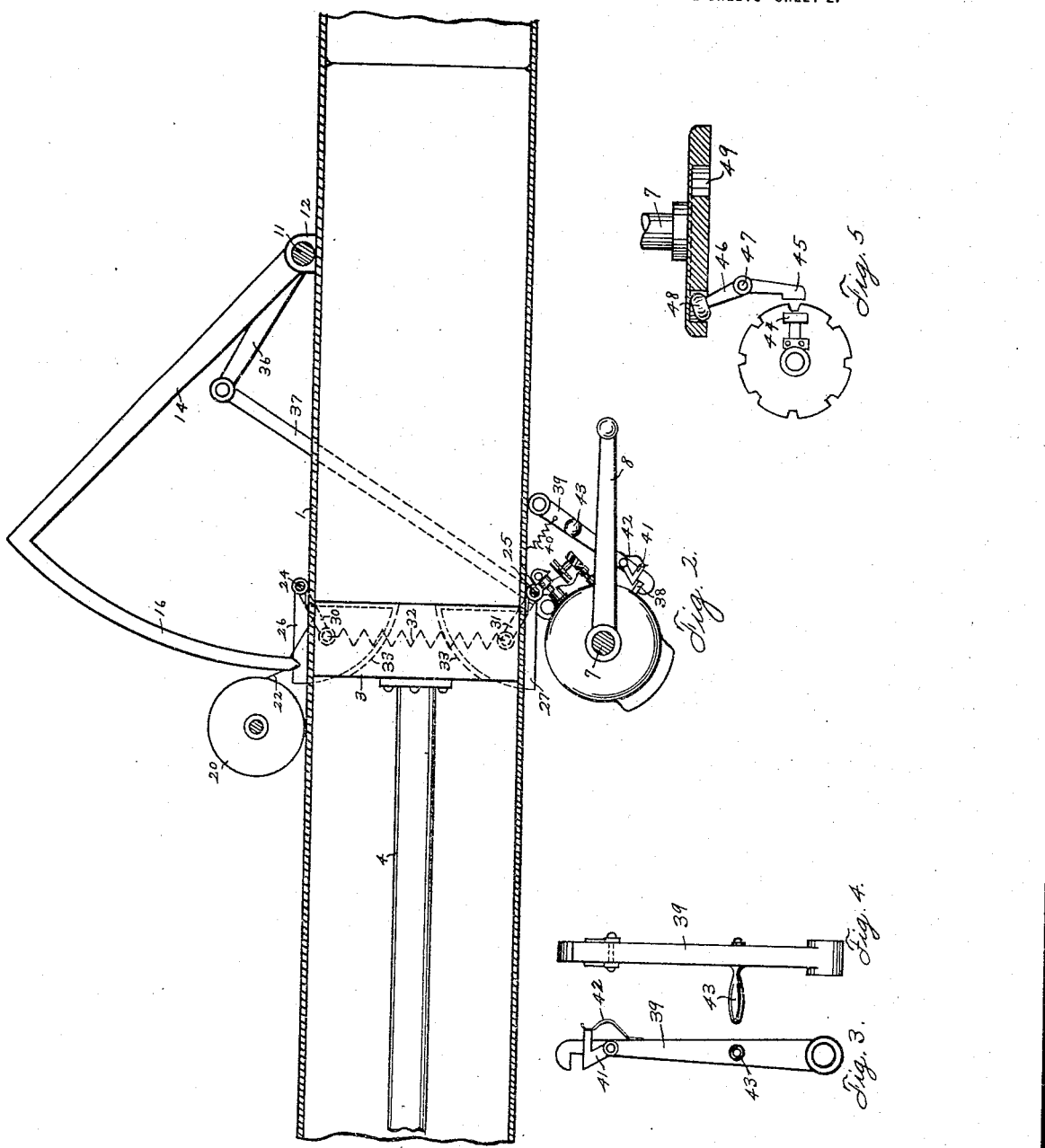

UNITED STATES PATENT OFFICE.

ANDREW T. DUDLEY, OF HOUSTON, TEXAS, ASSIGNOR OF ONE-TENTH TO W. L. MITCHELL, J. H. MITCHELL, AND H. E. WERNER, ALL OF HOUSTON, TEXAS.

BALING-PRESS.

1,205,981.      Specification of Letters Patent.      Patented Nov. 28, 1916.

Application filed April 10, 1913. Serial No. 760,151.

*To all whom it may concern:*

Be it known that I, ANDREW T. DUDLEY, a citizen of the United States, residing at Houston, in the county of Harris and State of Texas, have invented certain new and useful Improvements in Baling-Presses, of which the following is a specification.

This invention relates to new and useful improvements in baling presses, and has more particular relation to presses designed for baling hay and other like material.

The object of the invention is to provide a device of the character described which is provided with a manually operated tying mechanism provided to carry tying cords or wires around the bale and secure them therearound before the bale is discharged from the press.

With the above and other objects in view, the invention has particular relation to certain novel features of construction, operation and arrangement of parts, an example of which is given in this specification and illustrated in the accompanying drawings, wherein—

Figure 1 is a sectional side elevation of the press. Fig. 2 is a sectional plan view thereof. Figs. 3 and 4, respectively, show side and edge views of the knotter locking device, and Fig. 5 shows a plan view partially in section of certain parts of one of the knotters employed.

Referring now more particularly to the drawings, wherein like numerals of reference designate similar parts in each of the figures, the numeral 1 refers to the baling or compress chamber which is provided with a feed hopper 2. The plunger 3 is provided to reciprocate back and forth in said chamber. A plunger rod 4 is rigidly attached to said plunger and is operatively connected with the usual driving means, (not shown) said driving means being of any well known and approved type such as is now in common use. Upon the back stroke the plunger 3 is withdrawn until it clears the inlet leading from the hopper 2 and upon its forward stroke drives the charge of hay fed in through said hopper forwardly and compresses the same until a sufficient number of charges are compressed to form a bale in the compress chamber 1.

Rotatably mounted in the bearings 5 and 6 carried by one side of the compress chamber is the vertical knotter shaft 7 to the upper end of which is rigidly secured the crank 8 by means of which the knotter shaft may be manually operated. The knotter shaft 7 carries and operates two knotters 9 and 10 substantially of the well known construction of the knotters now in common use in connection with grain binding machines. On the opposite side of the compress chamber 1 from the knotter shaft 7 is the vertical needle shaft 11 which is rotatably mounted in the bearings 12 and 13. Projecting from this shaft 11 and rigid therewith are the needle arms 14 and 15 whose free ends carry the needles 16 and 17, alined with the slots 18 and 19 through the sides of the compress chamber. These needles are of sufficient length to project through the respective slots 18 and 19 and extend entirely across the compress chamber and coöperate with the knotters 9 and 10.

Rotatably mounted upon the same side of the compress chamber with the needle shaft 11 are spools 20 and 21 upon which are wound the tying cords or wires 22 and 23. The free ends of these wires, respectively, pass through eyes in the points of the needles 16 and 17 and pass also through the respective slots 18 and 19 and are secured to the respective knotters 9 and 10. These wires thus reach across the compress chamber and as the bale is formed the wires embrace it upon its forward end and sides.

Two vertical shafts 24 and 25 are rotatably mounted upon the sides of the chamber 1, one being arranged upon each side a short distance in front of the plunger 3 when in its forward position. Each one of these shafts 24 and 25 have two dogs 26 and 27 rigidly secured thereto and projecting through the slots 28 and 29 alined therewith in the sides of the compress chamber.

Projecting rearwardly from the shafts 24 and 25 are the respective rigidly mounted arms 30 and 31 whose free ends are connected by a pull spring 32. When a charge of hay is fed through the hopper 2 and the plunger 3 is driven forward, the hay is driven against the rear edges of the dogs 26 and 27 and said rear edges are beveled or arcuate in plan view and as the hay is driven thereagainst the dogs are forced to spread, the tension of the spring 32 being overcome, until the material being compressed is driven past the dogs. The front edges of said dogs are abrupt and when no longer under the stress of the material being compressed, the tension of the spring 32, operating through the arms 30 and 31 and the shafts 24 and 25 forces said dogs inwardly through the slots 28 and 29 and corresponding slots 33 and 34 in the plunger 3 and as the plunger 3 is then withdrawn on its back stroke, said dogs operate to hold the material in its compressed form until the next forward stroke of the plunger.

Rigidly mounted upon the lower end of the knotter shaft 7 is an arm 35 and rigidly mounted upon the lower end of the needle shaft 11 is the arm 36 and the free ends of these arms are connected by a link 37 whose respective ends are pivoted to the respective free ends of said arms.

The driving disk of the knotter 9 has a shoulder 38 projecting from the periphery thereof and a hook 39 is provided, one end of which is pivoted to the side of the compress chamber 1 and the other end of which normally engages against the shoulder 38. This hook is held in engagement with said shoulder by the tension of the pull spring 40, one end of which is attached to the hook and the other end of which is attached to the side of the compress chamber. A latch 41 is pivoted to one side of the hook 39, having one side abrupt and the other sloping and normally held in engagement behind the shoulder 38 by a flat spring 42 which presses against said latch. A hand grip 43 projects upwardly from the hook 39.

When the bale is completed, the operator, by a pull upon the grip 43 disengages the hook 39 from the shoulder 38 and then rotates the knotter shaft through the crank 8. This operates through the arms 35 and 36 and the link 37 to impart a partial rotation to the needle shaft 11 and carry the needle arms 14 and 15 around toward the compress chamber and the needles 16 and 17 are thus caused to project across the compress chamber and carry the tying wires 22 and 23 around the rear end thereof and said wires are carried into engagement with the respective knotters 9 and 10 by which they are tied around the bale. One complete rotation of the shaft 7 is sufficient to project the needles across the chamber 1 and tie the wires and restore said needles to their original position. In the meantime the shoulder 38 will have engaged the sloping side of the latch 41 and forced the same back until the shoulder will have passed the same and the flat spring 42 will have driven said latch down behind said shoulder and the shoulder will have engaged against the hook 39, said latch and hook locking the knotters against movement in either direction.

For the purpose of severing the wires after the same have been tied around the bale, a stationary cutter 44 is secured to each knotter and a movable cutter 45 is provided which opposes said stationary cutter. The cutter 45 is carried on the free end of the arm 46, pivoted at an intermediate point to the knotter frame and the other end of this arm 46 has a roller bearing 48 which travels in an eccentric groove 49 in the knotter disk. This groove is so shaped that when the knotter is tied the bearing 48 will be forced inwardly toward the center of the disk which will impart an opposite movement to the cutter 45 and the cutters 44 and 45 will coöperate in the manner of the ordinary shears and sever the wire. The completed bale may then be discharged from the compress chamber in the ordinary manner. It will usually be forced out gradually by the formation of a new bale in the manner hereinbefore described.

What I claim is:—

1. A device of the character described including a compress chamber, a plunger arranged to reciprocate therein and compress material into a bale, a plurality of dogs arranged to engage with the compressed material and prevent the expansion thereof, a needle shaft arranged on one side of the compress chamber, a plurality of swinging needles carried thereby and provided to carry tying cords around said bale, wire storing means carried on one side of the compress chamber, a knotter shaft on the opposite side of said compress chamber, a plurality of knotters operated thereby, said knotters being arranged to co-act with the needles and secure the cords around said bale, means for manually rotating the knotter shaft, a mechanism engaging with the knotter shaft and provided to lock the same against rotation, an arm fixed to the lower end of the knotter shaft, an arm fixed to the lower end of the needle shaft, a link connecting the free ends of said arms, said link operating to rotate the needle shaft simultaneously with the knotter shaft and swinging the needles back and forth through the compress chamber during the operation of said knotter shaft and said knotters.

2. A device of the character described including a compress chamber, a reciprocating plunger therein, a means provided to engage with the compressed material and prevent the expansion thereof, a rotatable needle shaft on one side of said chamber, needles carried thereby and provided to carry securing wires around the bale, wire storing means on one side of said chamber, a knotter shaft on the opposite side thereof, knotters operated thereby and arranged to co-act with the needles and secure said wires around the bale, means for rotating the knotter shaft, a locking mechanism provided to engage with said shaft and lock it against rotation, an operative connection between the knotter and needle shafts whereby the latter is rotated from and simultaneously with the former to swing the needles back and forth through said chamber during the operation of the knotter shaft and knotters.

In testimony whereof I have signed my name to this specification in the presence of two subscribing witnesses.

ANDREW T. DUDLEY.

Witnesses:
J. W. YEAGLEY,
A. F. IRWIN.

Copies of this patent may be obtained for five cents each, by addressing the "Commissioner of Patents, Washington, D. C."